United States Patent
Li et al.

(10) Patent No.: US 10,902,022 B2
(45) Date of Patent: Jan. 26, 2021

(54) OLAP PRE-CALCULATION MODEL, AUTOMATIC MODELING METHOD, AND AUTOMATIC MODELING SYSTEM

(71) Applicant: SHANGHAI KYLIGENCE INFORMATION TECHNOLOGY CO., LTD, Shanghai (CN)

(72) Inventors: Dong Li, Shanghai (CN); Qing Han, Shanghai (CN); Yang Li, Shanghai (CN)

(73) Assignee: SHANGHAI KYLIGENCE INFORMATION TECHNOLOGY CO., LTD, Shanghai (CN)

(*) Notice: Subject to any disclaimer, the term of this patent is extended or adjusted under 35 U.S.C. 154(b) by 491 days.

(21) Appl. No.: 15/659,664

(22) Filed: Jul. 26, 2017

(65) Prior Publication Data

US 2018/0285439 A1  Oct. 4, 2018

Related U.S. Application Data

(63) Continuation of application No. PCT/CN2017/086133, filed on May 26, 2017.

(30) Foreign Application Priority Data

Mar. 28, 2017 (CN) .......................... 2017 1 0192889

(51) Int. Cl.
   *G06F 16/2455* (2019.01)
   *G06F 16/28* (2019.01)
   *G06F 16/2453* (2019.01)
   *G06F 16/2458* (2019.01)

(52) U.S. Cl.
   CPC ........ *G06F 16/283* (2019.01); *G06F 16/2453* (2019.01); *G06F 16/2455* (2019.01); *G06F 16/2462* (2019.01)

(58) Field of Classification Search
   CPC ...... G06F 16/283; G06F 17/283; G06F 40/42; G06F 16/2455; G06F 16/2462; G06F 16/24556; G06F 16/284
   USPC .................................................. 707/600, 755
   See application file for complete search history.

(56) References Cited

U.S. PATENT DOCUMENTS

| | | | |
|---|---|---|---|
| 6,484,179 B1* | 11/2002 | Roccaforte | ............. G06F 16/30 707/737 |
| 8,938,416 B1* | 1/2015 | Cole | ................. G06F 16/24556 707/607 |
| 2013/0275365 A1* | 10/2013 | Wang | .................... G06F 16/283 707/602 |

* cited by examiner

*Primary Examiner* — Marcin R Filipczyk (57) ABSTRACT

The present application relates to an OLAP pre-calculation model, an automatic modeling method and an automatic modeling system. The model includes a dimension module, an aggregation group module and a measure module. The method includes collecting data statistics on all data sources to obtain data statistics result, conducting query dryrun based on data model and sample queries given by a user to determine a business model, conducting query dryrun on the sample queries and collecting query statistics, carrying out physical modeling and defining dimension, measure and aggregation group of a pre-calculation model, and obtaining a business modeling result and a pre-calculation model. The system includes data statistics module, business model module, query statistics module, and model establishing modules. A more efficient combination of pre-calculated dimensions can be produced and redundant calculation and data storage can be reduced.

5 Claims, 4 Drawing Sheets

OLAP PRE-CALCULATION MODEL, AUTOMATIC MODELING METHOD, AND AUTOMATIC MODELING SYSTEM

CROSS REFERENCE TO RELATED APPLICATIONS

The present application is a Continuation Application of PCT Application No. PCT/CN2017/086133 filed on May 26, 2017, which claims the benefit of Chinese Patent Application No. 201710192889.1 filed on Mar. 28, 2017. All the above are hereby incorporated by reference.

FIELD OF THE TECHNOLOGY

The present application relates to the technical field of OLAP (online analytical processing) multi-dimensional data analytics, and more particularly to an OLAP pre-calculation model, an automatic modeling method, and an automatic modeling system.

BACKGROUND

In the era of information and data, it is an important topic of business intelligence and data mining to analyze data during multi-dimensional analytics in order to support decision-making. OLAP (especially MOLAP) is generated to solve the problem.

Under normal circumstances, the data volume in data warehouse is quite large. One needs to spend a lot of computing resources, and consume a very long query latency to carry out multi-dimensional aggregation operation directly for a large amount of data. OLAP provides a solution to improve the efficiency of multi-dimensional analytics based on pre-calculation. That is, pre-aggregation is carried out on data in the data warehouse by different dimension combinations through the realization of an "OLAP Cube", and the results are saved. When an analyst performs an actual business query, there is no need to carry out aggregation computation on the data again. Instead, the query can read the pre-calculated results directly, making it possible for analyst to interactively analyze millions or even up to hundreds of millions of data.

Figure 6:
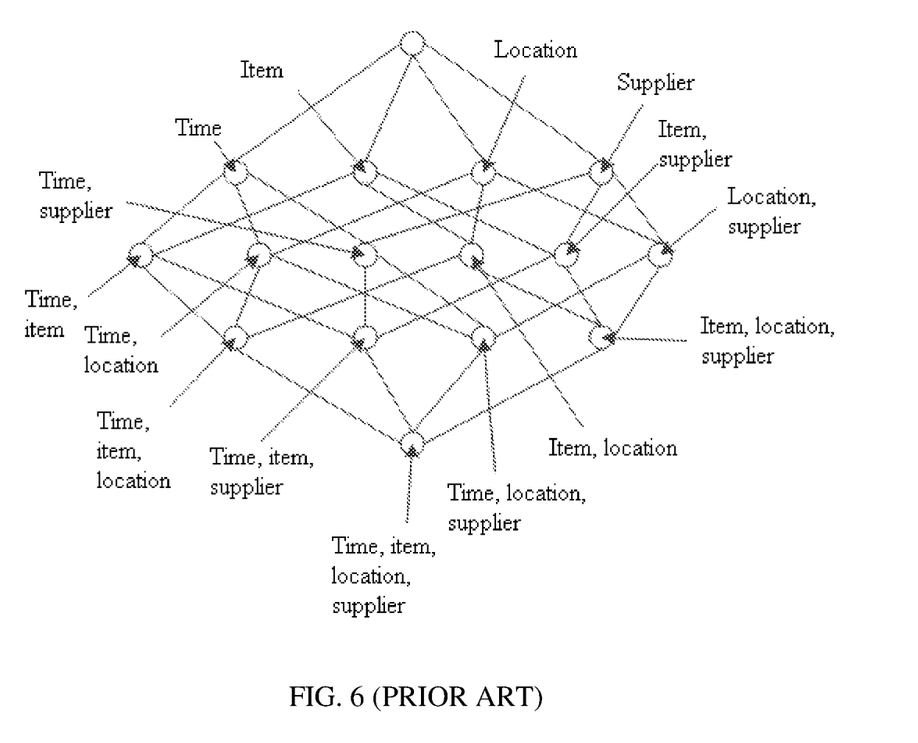
FIG. 6 is a schematic diagram of a combination of dimensions of the prior art.

The OLAP Cube is an abstract of multi-dimensional analytics data models in a data warehouse. It contains different dimension combinations for multi-dimensional analysis. For example, as shown in FIG. 6, it contains four dimensions, namely time, item, location and supplier. Different combinations of these four dimensions form different nodes in the OLAP Cube. Each node represents a measure aggregation result under a combination of dimensions. When a user performs multi-dimensional analysis, a selected dimension combination corresponds to a node in the Cube. The value considered is the measure of the aggregation behind the node.

In a common OLAP solution, in order to analyze the selected dimension more quickly, the OLAP Cube is materialized. That is, the measures for each node on the OLAP Cube are aggregated in advance, and the results are saved. When a business analyst performs a query, the system can return the pre-calculated results directly. The aggregation calculation at the time-cost of O(N) level can be converted into results scanning at O(1) level. Thus, the increase in efficiency of query can be realized.

OLAP Cube also defines the hierarchy of dimensions. For example, there exists a hierarchical relationship between the three dimensions of year, month, day: year>month>day. These hierarchical relationships can often be mapped to concepts in existing applications so that an analyst can be more flexible in application in a data mining system.

However, for multi-dimensional analytics cases on big data, the data size is often in the hundreds of billions or even trillion, the number of dimensions is too large, and the cardinality of dimensions is too large. Therefore, there is a risk of explosion of dimensions. If pre-calculation is still carried out for all combinations of dimensions, it will lead to long pre-calculation duration, and excessive amount of results. This increases the cost of calculation and storage. On the other hand, it is also a challenge to scan the large amount of pre-calculation results at query time.

SUMMARY

The technical problem to be solved by the OLAP pre-calculation model of the present application is that, in the current technology, there is a hidden risk of dimension explosion because of large number of dimensions and high cardinality in data analytics. Furthermore, the pre-calculation time is too long and the amount of result data is too large. On one hand, it increases the pre-calculation and storage costs, and on the other hand, it becomes a challenge to scan the large number of pre-calculation results.

To solve the above technical problems, the present application provides an online analytical processing (OLAP) pre-calculation model including a dimension module; an aggregation group module; and a measure module, the dimension module including a normal dimension unit and a derived dimension unit, wherein the normal dimension unit pre-calculates a column of a fact table or dimension table, and the derived dimension unit pre-calculates the primary key of a dimension table and records a mapping relation between a column and the primary key of the dimension table; the primary key of the dimension table of the derived dimension in the derived dimension unit and a normal dimension in the normal dimension unit being used as a number of pre-calculated dimensions, conforming to a designated ordered sequence; wherein the aggregation group module divides the pre-calculated dimensions in the dimension module into a plurality of aggregation groups; and the measure module generates a result of pre-calculation according to a combined aggregation of all of the pre-calculated dimensions in the dimension module.

The beneficial effect of the OLAP pre-calculation model of the present application is that a more efficient combination of pre-calculated dimensions can be carried out and redundant calculation and data storage can be reduced by the concept of derived dimensions and aggregation groups. It has greater calculation efficiency and occupies smaller storage so that a better result can be achieved in multi-dimensional analytics application of big data.

Furthermore, the aggregation group module may include a mandatory dimension unit; a joint dimension unit; a hierarchy dimension unit; and a dimension number range unit, wherein the mandatory dimension unit records all dimension combinations containing a designated dimension A, the joint dimension unit records all dimension combinations containing a designated joint dimension AB, the hierarchy dimension unit records designated dimension combinations containing a group of dimensions ABC having a hierarchical relationship, the dimension number range unit records all dimension combinations with number of dimensions within a certain range, and the aggregation group module divides all of the pre-calculated dimensions in the dimension module into a plurality of aggregation groups, while also preserves a combination of all pre-calculated dimensions in the dimension module for multi-dimensional querying between different aggregation groups.

A further beneficial effect of the above is that it provides a concept of aggregation group. That is, all the pre-calculated dimensions are divided into several aggregation groups. Different combinations are generated only within each aggregation group. There is no cross combination among different aggregation groups. In addition, a combination of all dimensions is retained to handle multi-dimensional queries across the aggregation groups. According to the dependencies of business, relevant dimensions are allocated into the same aggregation group. This can effectively eliminate meaningless dimension combinations, and reduce the cost of pre-calculation.

Furthermore, the derived dimension unit includes derived dimensions which are dimensions in which the cardinality of dimension is approximately equal to the cardinality of the primary key.

A further beneficial effect is that the derived dimension itself does not participate in the pre-calculation, but will carry out pre-calculation for the primary key of the dimension table. In addition, the dimension table snapshot is saved for recording the mapping relationship between the derived dimension column and the primary key. Since the dimension table records are relatively fixed, and the amount of data is usually small, a user can quickly look up the dimension table snapshot for derived dimension and primary key value conversion during query. Then, according to foreign key value, the user can query the snapshot of the dimension table in order to find the value of measure. When the dimension table is set with a number of derived dimensions, only one pre-calculated dimension is actually added, and hence reduction of dimensionality can be achieved.

The present application also relates to an automatic modeling method based on the OLAP pre-calculation model. The method may include the steps of:

S1: collecting data statistics according to a data model and a data source given by a user to obtain a result of the data statistics;

S2: conducting a query dryrun according to the data model and sample queries given by the user to determine a business model;

S3: conducting a query dryrun on the sample queries, and collecting query statistics;

S4: carrying out a physical modeling based on the business model in S2 and the result of the data statistics in S1, and defining dimension, measure, and aggregation group of a pre-calculation model;

S5: adjusting the model after the physical modeling in S4 based on the query statistics in S3 to obtain a result of business modeling;

S6: optimizing the business modeling in S5 to obtain the pre-calculation model.

The method of the present application has the advantage of solving the data explosion problem in the big data scenario, improving the efficiency of query, and improving the production efficiency by intelligent means. In addition, the automatic modeling method of the present application can be applied to a big data analysis platform based on Apache Kylin for verification. The Cube (pre-calculation model) created by automatic modeling can ensure that the query time is in a matter of seconds even for a database having billions of data, and can ensure within 10 times the expansion rate. It can effectively lower the Apache Kylin user's level of difficulty in learning, reduce the trial and error cost, and optimize user experience.

Furthermore, the physical modeling in S4 may include a dimension setting; a measure setting, and an aggregation group setting.

Furthermore, the dimension setting may include a normal dimension setting and a derived dimension setting; and the method comprises calculating an $F(i)$ value for each dimension, and if $F(i)$ is less than a designated threshold, then set an ith dimension as a derived dimension, otherwise set as a normal dimension; and defining $F(i)=CD(col\_i)/CD(PK)$, where $CD(col\_i)$ is the cardinality of the ith dimension, and $CD(PK)$ is primary key cardinality, the primary key of the derived dimension and the normal dimension are used as the pre-calculated dimensions, and are arranged in descending order according to the cardinality.

Furthermore, rules of the aggregation group setting may include: setting a minimum value and a maximum value of a dimension number range as designated default values; when $CD(i)$ is nearly equal to 1, then set the dimension as a mandatory dimension; when $CD(i)/CD(i,j)$ and $CD(j)/CD(i,j)$ are both nearly equal to 1, then set the ith dimension and the jth dimension as a set of joint dimensions; when $CD(j)/CD(i,j)$ is nearly equal to 1 and $CD(i)/CD(i,j)$ is less than 1, then set the ith dimension and the jth dimension as a set of hierarchy dimensions, wherein function $CD(i)$ is defined as cardinality of the ith dimension, and the hierarchy relationship are: ith dimension>jth dimension.

Furthermore, the adjusting step in S5 may include orderly adjusting the pre-calculated dimensions and adjusting the aggregation groups.

Furthermore, rules of orderly adjusting the pre-calculated dimensions may include defining $Score(i)=Wp*CD(i)+Wb*F(i)/F$, i.e. sorting all of the pre-calculated dimensions according to a value of $Score(i)$ in descending order; wherein $F(i)$ is defined as number of times the ith dimension becomes a filter condition in the query, F is the total number of filter conditions in the query statistics, $Wp$ is a physical modeling weight, $Wb$ is a business modeling weight, and $CD(i)$ is the cardinality of the ith dimension.

Furthermore, rules of adjusting the aggregation groups may include: defining $Score(i)=Wp*CD(i)+Wb*P(i)/P$, if $Score(i)$ is nearly equal to 1, then set the ith dimension as a mandatory dimension; defining $Score(i,j)=Wp*CD(i)*CD(j)/CD(i,j)+Wb*P(i,j)/P$, if score values of the ith dimension and the jth dimension are greater than a designated threshold, the ith dimension and the jth dimension are set as a joint dimension; wherein $P(i)$ is defined as number of occurrences of the ith dimension in the query, P is number of sample queries, $Wp$ is a physical modeling weight, $Wb$ is a business modeling weight, and $CD(i)$ is the cardinality of the ith dimension; defining $ScoreJoint(i,j)=Score(i)*Score(j)$, if $ScoreJoint(i,j)$ is less than the designated threshold, an ith group of the joint dimensions and a jth group of the joint dimensions are combined into a group of joint dimensions; wherein Max is defined as a maximum number of dimensions of a single query in the query statistics, and W is defined as a dimension expansion coefficient of a designated value, then set Max*W as a maximum value of a dimension number range.

A further beneficial effect of the above is the importance of balance between physical modeling and business modeling. If the physical modeling weight is too high, it will lead to a strong generalization of the model. However, the query performance for the target SQL may not be optimal. If the business modeling weight is too high, it will lead to an over-fitting model. It can achieve the best query performance only for the target SQL. However, optimal performance cannot be guaranteed for queries outside the target SQL. Therefore, the method of the present application can effectively avoid the occurrence of these problems and improve the accuracy of the model.

The present application further relates to an automatic modeling system using the automated modeling method based on the OLAP pre-calculation model. The system may include a data statistics module; a business model module; a query statistics module; and a model establishing module, wherein the data statistics module collects the data statistics according to the data model and the data source given by the user, and obtains a result of the data statistics; the business model module conducts a query dryrun according to the data model and sample queries given by the user to determine the business model; the query statistics module conducts a query dryrun on the sample queries, and collects the query statistics; the model establishing module obtains a result of business modeling based on the data statistics module, the business model module, and the query statistics module.

DETAILED DESCRIPTION

The principles and features of the OLAP pre-calculation model of the present application will be described below with reference to the accompanying drawings, which are given by way of illustration only and are not intended to limit the scope of the protection.

Embodiment 1

Figure 1:
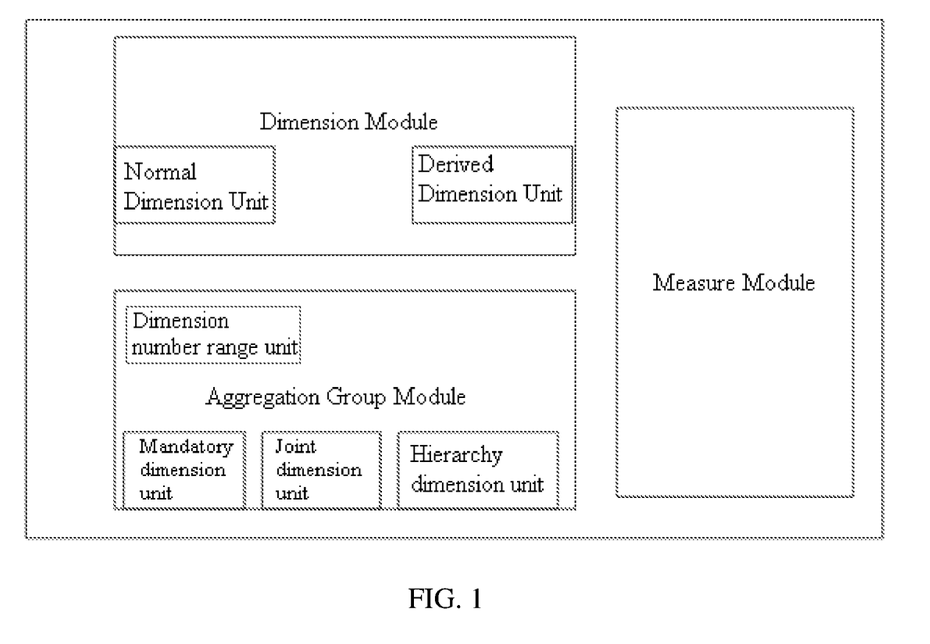
FIG. 1 is a schematic diagram of an OLAP pre-calculation model of the present application.

As shown in FIG. 1, an online analytical processing (OLAP) pre-calculation model may include a dimension module; an aggregation group module; and a measure module. The dimension module may include a normal dimension unit and a derived dimension unit. The normal dimension unit pre-calculates a column of a fact table or dimension table, and the derived dimension unit pre-calculates the primary key of a dimension table and records a mapping relation between a column and the primary key of the dimension table. The primary key of the dimension table of the derived dimension in the derived dimension unit and a normal dimension in the normal dimension unit may be used as a number of pre-calculated dimensions, conforming to a designated ordered sequence. The aggregation group module may divide the pre-calculated dimensions in the dimension module into a plurality of aggregation groups; and the measure module can generate a result of pre-calculation according to a combined aggregation of all of the pre-calculated dimensions in the dimension module.

Derived Dimension

Figure 3:
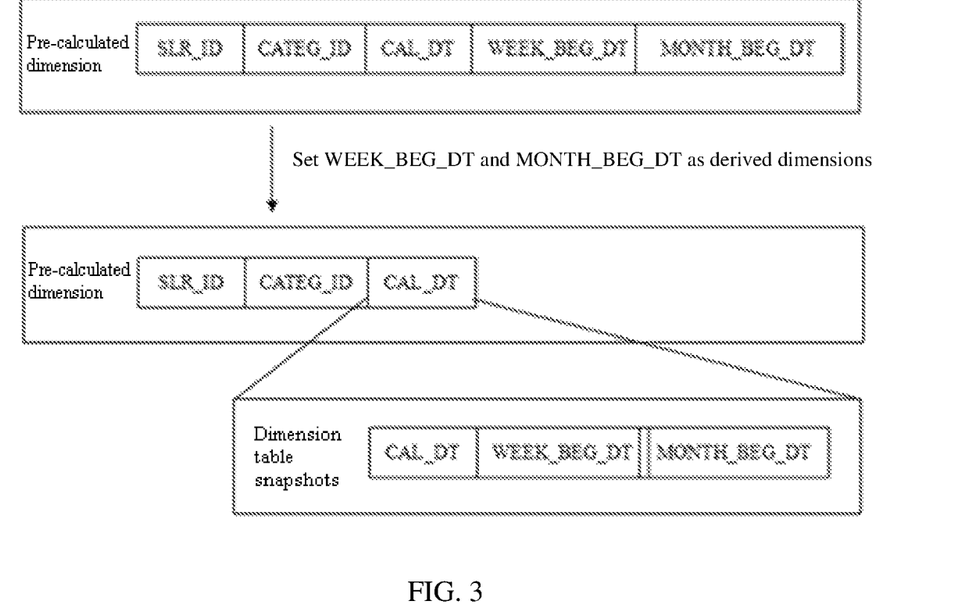
FIG. 3 is a schematic diagram of a derived dimension principle according to an embodiment of the present application.

The dimension table contains details of dimensions. In other words, many of the columns on the dimension table often have close mapping relationship with dimension keys. As shown in FIG. 3, using a time dimension table as an example, the primary key cal_dt represents the date with day as a unit. The column week_beg_dt represents the starting day of the week where the primary key date is located, and the column month_beg_dt represents the starting day of the month where the primary key date is located. If these dimensions are pre-calculated, then these three dimensions will produce eight dimension combinations. However, if only cal_dt is pre-calculated, and when a query requires week_beg_dt and month_beg_dt, the dimension value can be converted into cal_dt value through mapping relationship, and then only cal_dt is involved in the pre-calculation. This will only produce two dimension combinations, and eventually save 75% of the pre-calculation cost.

In order to achieve such a scheme, the present application proposes a concept of derived dimension. The derived dimension is derived from the dimension table. The derived dimension itself does not participate in the pre-calculation, but will carry out pre-calculation for the primary key of the dimension table. In addition, the dimension table snapshot is saved for recording the mapping relationship between the derived dimension column and the primary key. Since the dimension table records are relatively fixed, and the amount of data is usually small, a user can quickly look up the dimension table snapshot for derived dimension and primary key value conversion during query. Then, according to foreign key value, the user can query the snapshot of the dimension table in order to find the value of measure. When the dimension table is set with a number of derived dimensions, only one pre-calculated dimensions is actually added, and hence reduction of dimensionality can be achieved.

Order of Pre-Calculated Dimensions

In an ordinary query engine, query performance of the dimensions at the front of the combination is higher than that of the dimension at the end of the combination for a given dimension combination as a filter condition. Therefore, placing dimensions in a business model that are often used as filter condition at the front of the combination will increase query efficiency. In addition, placing dimensions having a high cardinality at the front of the combination can also help to significantly reduce data scanning and pre-calculation cost, and shorten the query time.

Aggregation Group

In the actual multi-dimensional analytics scenario, not all dimension combinations are meaningful. For example, supplier dimensions and website traffic dimensions do not often appear at the same time in multi-dimensional analytics cases. It is a waste to pre-calculate dimension combinations of low usage.

The present application proposes a concept of aggregation group. It divides all of the pre-calculated dimensions into several aggregation groups, generating only different combinations within each aggregation group, and the different aggregation groups are not cross-combined. In addition, a combination of full dimensions is retained to handle multi-dimensional queries across aggregation groups. According to the dependency between the business to the relevant dimension is divided into the same aggregation group, you can effectively remove the meaningless dimension combination, reducing the cost of pre-calculation.

Figure 4:
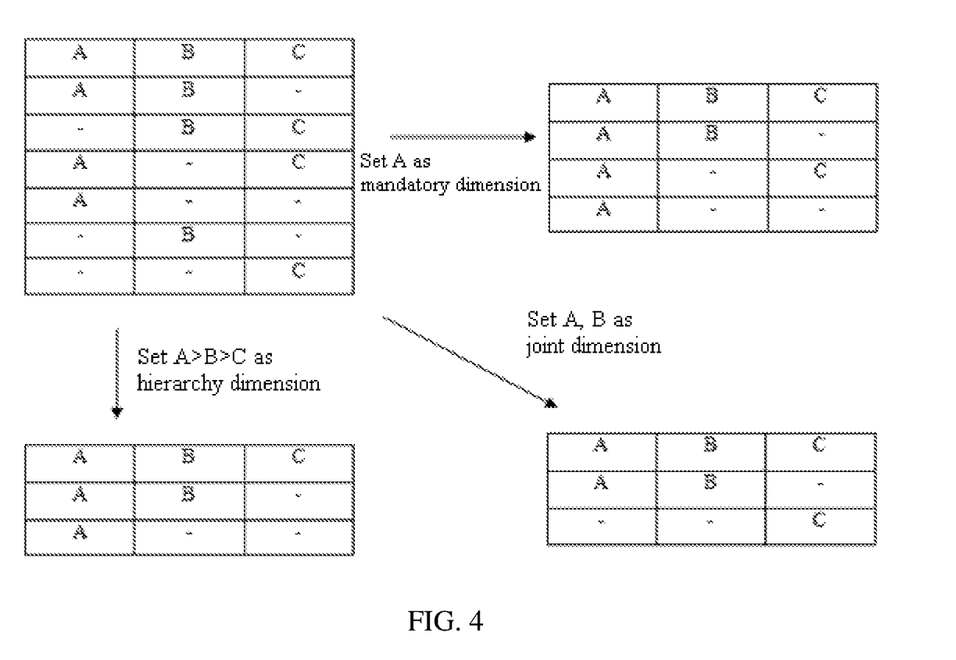
FIG. 4 is a schematic diagram of the rules of an aggregation group according to an embodiment of the present application.

Within one aggregation group, there are often some relationships among the dimensions. For example, some dimensions appear in almost all of the analytics queries, resulting in a very low usage of dimension combinations that do not contain those dimensions. Some dimensions are present in queries at the same time, resulting in a very low usage of dimension combinations that contain only part of these dimensions. Some dimensions have hierarchical relationships, resulting in a very low usage of some dimension combinations that does not follow the hierarchical relationships. The number of dimensions used in a query is limited, resulting in a very low usage of dimension combination with high dimensionality. In order to solve these problems, the method of the present application defines four rules for aggregation group, namely mandatory dimension rule, hierarchy dimension rule, joint dimension rule, and dimension number range rule. The mandatory dimension rule refers to a dimension that occurs in each combination of the current aggregation groups, i.e. the dimension combinations that do not contain the mandatory dimension are removed. The joint dimension rule specifies certain groups of dimensions. Each group of dimension will appear in the dimension combination at the same time, combinations that contain only part of these dimensions are removed. The hierarchy dimension rule also specifies certain groups of dimensions. Each group of dimensions requires the existence of hierarchical relationship, such as (country, province, city), time (year, month, day), etc. When the final dimension combination is generated, all of the orphan trees will be discarded. For aggregation group rule, shown in FIG. 4, A, B, C are three dimensions, where A is a mandatory dimension in right-top chart, A and B are combined as a joint dimension in left-bottom chart, and A>B>C is set as a hierarchy dimension in right-bottom chart. The dimension number range rule specifies a maximum value and a minimum value, i.e., those combinations having the number of dimensions not falling within the range between the minimum value and the maximum value are removed.

Embodiment 2

Figure 2:
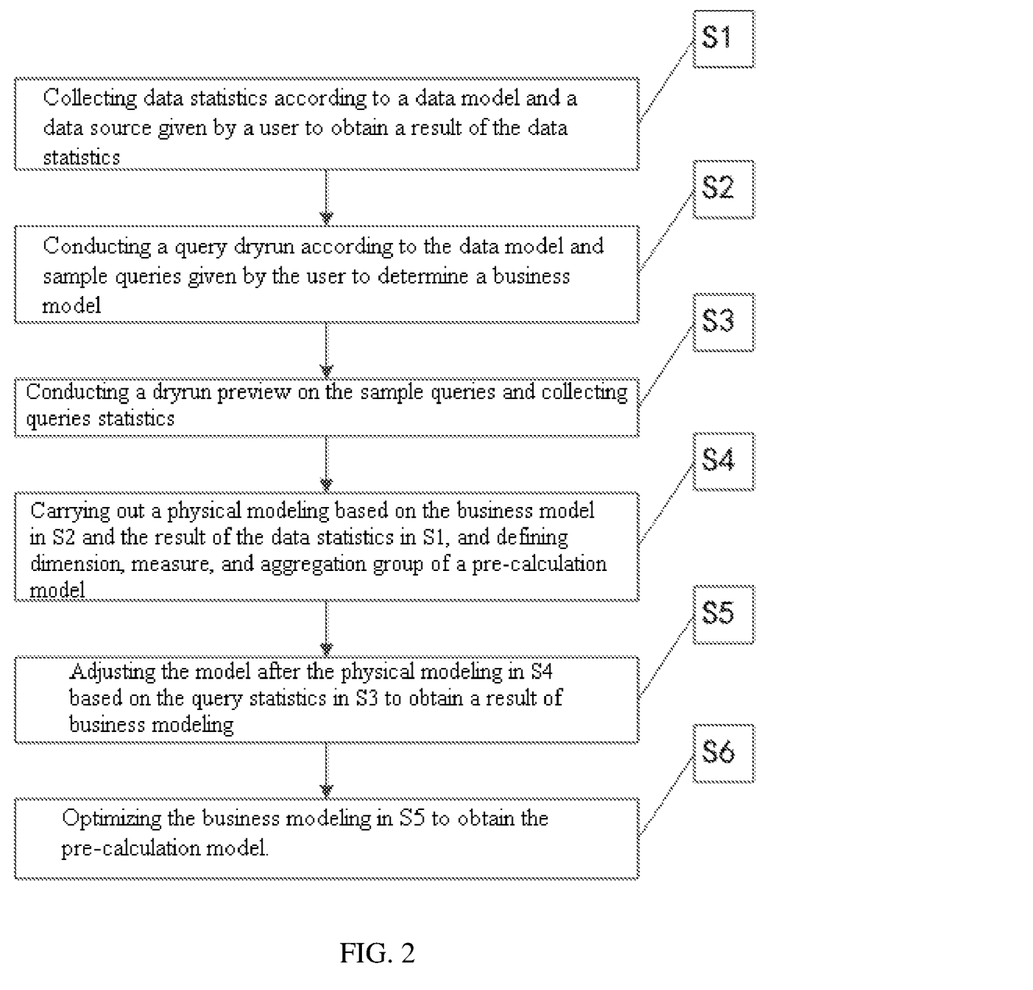
FIG. 2 is a flow chart of an automatic modeling method based on the OLAP pre-calculation model of the present application.

FIG. 2 shows an automatic modeling method based on the OLAP pre-calculation model. The method may include the steps of:

S1: collecting data statistics according to a data model and a data source given by a user to obtain a result of the data statistics;

S2: conducting a query dryrun according to the data model and sample queries given by the user to determine a business model;

S3: conducting a query dryrun on the sample queries, and collecting query statistics;

S4: carrying out a physical modeling based on the business model in S2 and the result of the data statistics in S1, and defining dimension, measure, and aggregation group of a pre-calculation model;

S5: adjusting the model after the physical modeling in S4 based on the query statistics in S3 to obtain a result of business modeling;

S6: optimizing the business modeling in S5 to obtain the pre-calculation model.

The method of the present application has the advantage of solving the data explosion problem in the big data scenario, improving the efficiency of query, and improving the production efficiency by intelligent means. In addition, the automatic modeling method of the present application can be applied to a big data analysis platform based on Apache Kylin for verification. The Cube (pre-calculation model) created by automatic modeling can ensure that the query time is in a matter of seconds even for a database having billions of data, and can ensure within 10 times expansion rate. It can effectively lower the Apache Kylin user's level of difficulty in learning, reduce the trial and error cost, and optimize the user's experience.

Figure 5:
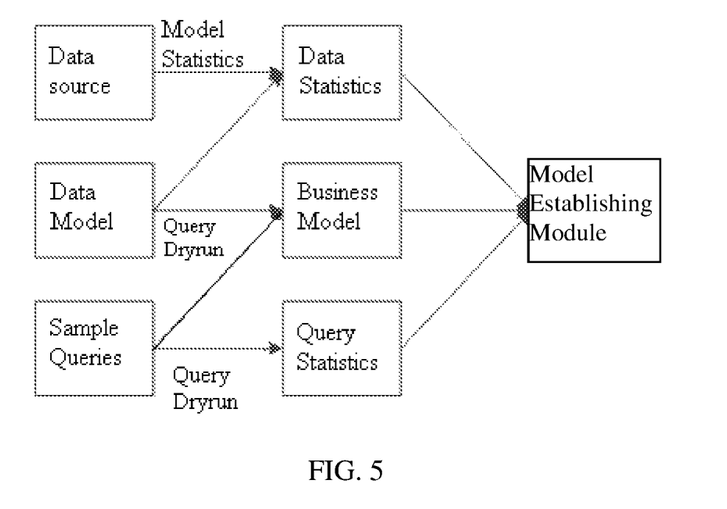
FIG. 5 is a schematic diagram of an automatic modeling system based on the OLAP pre-calculation model of the present application.

FIG. 5 shows the overall architecture of the technical scheme of the method of the present application. The target output of the whole architecture is a pre-calculation model, which may include dimensions of the model (including normal dimensions and derived dimensions), the measures (pre-calculated calculators), and aggregation groups, etc. Therefore, operation of the automatic modeling is to use the data model, data statistics, sample queries, etc. as input, select the appropriate dimension column and dimension type, add the required measure and pre-calculated calculator, and set a reasonable aggregation group.

Data Statistics

Statistics of all the data source tables involving the model can be collected to provide accurate data support for modeling, especially the cardinality of dimensions. Through cardinality, expansion coefficient of dimensions in view of the pre-calculated results can be estimated. In addition, many OLAP systems will encode the dimensions in order to save storage space. Understanding the maximum length and data type of column values will help to select the appropriate encoding method. Therefore, the cardinality, extremum, length extremum, and data samples of the data source tables are required before automatic modeling.

In data warehouse, the data model defines table relationship and dimension scope, and provides a template for the pre-calculation model. Data model is an abstraction of data characteristics and an educational framework of database management. It is a form of architecture in a database system that provides information representation and operational means. The data model includes the structural part of the database data, the operation part of the database data, and the constraints of the database data. Data is a symbolic record of objects. Model is an abstraction of the real world. In fact, there is a strong correlation between many columns in the data model. For example, the delivery time of an order and the time of making the order tend to meet similar distribution characteristics. In a pre-calculation modeling stage, one can use the correlation characteristics to properly set up aggregation group rules to solve dimension disaster problems. Therefore, before automatic modeling, one needs to collect statistics of the correlation among columns in the data model.

Query Dryrun

First, the method of the present application requires a SQL query dryrun engine to execute sample SQL based on data model given by a user. The example in the present application refers to some data templates that have been obtained before the execution of SQL. The engine does not return any meaningful query results, but rather sort out and collect statistics of the analysis result of the query during the query process. It mainly includes:

Generation of business model: The data model defines the largest category of business analysis. However, an actual analysis scenario is only concerned with a part of the data model. It is so-called the business model. The business model includes the dimensions and the measure calculation factor of the actual participant queries, which is also the basis for initializing the pre-calculation model.

Collection of statistical dimension usage: In SQL, the main usage of a dimension column is Filter and Group By. This step will collect statistics of the frequency of each dimension being used as Filter and Group By. In addition, it also collects statistics of the frequency of simultaneous occurrence among dimensions so as to infer the correlation among columns from a business perspective.

Physical Modeling

This step is the core step of the method of the present application. Business model contains all of the dimensions and measures that are required for business analysis, and defines the basis for pre-calculation modeling. This step is based on data statistics. It carries out modeling on the basis of the business model. According to the order of implementation, it may include the following steps:

Dimension setting: The dimension setting may include a normal dimension setting and a derived dimension setting; and the method may include calculating an F(i) value for each dimension, and if F(i) is less than a designated threshold, then set an ith dimension as a derived dimension, otherwise set as a normal dimension; and defining F(i)=CD (col_i)/CD (PK), where CD (col_i) is a cardinality of the ith dimension, and CD (PK) is primary key cardinality, the primary key of the derived dimension and the normal dimension are used as the pre-calculated dimensions, and are arranged in descending order according to the cardinality.

Measure setting: After query dryrun, all pre-calculation requirements have been counted in the business model. Pre-calculated measures can be generated directly based on the measures of the business model.

Aggregation group setting: To simplify the operation, all columns are added to an aggregation group by default. The aggregation group rule is set according to the dimension characteristics in the aggregation group. Then, function CD(i) is defined as the cardinality of the ith dimension, and all dimensions are checked as follows:

when CD(i)≈1, then set the dimension as a mandatory dimension;

when CD(i)/CD(i,j)≈1 and CD(j)/CD(i,j)≈1 then set the ith dimension and the jth dimension as a set of joint dimensions;

when CD(j)/CD(i,j)≈1 and CD(i)/CD(i,j)<1 then set the ith dimension and the jth dimension as a set of hierarchy dimensions. The hierarchical relationship is: ith dimension>jth dimension.

If the ith dimension and the jth dimension are simultaneously a Join condition in the table of the data model, and do not participate in the Join condition in other tables, then the ith dimension and the jth dimension are set as a group of joint dimensions.

When the CD (i) is less than a designated threshold, then it is added to candidate groups of joint dimensions. Finally, the candidate groups are divided into a plurality of joint dimension groups, and the product of cardinality of each group is guaranteed to be within the set range.

For dimension number range rule, a minimum value and a maximum value of the dimension number range are set as designated default values.

Business Modeling

This step is mainly based on a sample SQL. It adjusts the model given by the physical modeling in order to optimize the target SQL query performance and reduce storage amount of the target SQL. However, excessive use of business modeling will lead to an over-fitting model. Thus, the method of the present application sets the weight in order to balance the results of physical modeling and business modeling. In the mathematical formula, Wp is defined as a weight carrying out the physical modeling, Wb is a weight carrying out the business modeling, and CD (i) is the cardinality of the ith dimension. The main process of model adjustment is as follows:

Adjusting Aggregation Group Rules: Usage of dimension in target SQL and the coexistence relationship among dimensions can be used to adjust the rules for an aggregation group. P (i) is defined as the number of occurrences of the ith dimension in the query, and P is the number of samples. The rules are as follows:

define Score (i)=Wp*CD (i)+Wb*P (i)/P, if Score (i)≈1, then consider setting the ith dimension as a mandatory dimension;

define Score(i, j)=Wp*CD(i)*CD(j)/CD(i, j)+Wb*P (i, j)/P, if the score value of the ith dimension and the jth dimension are greater than a designated threshold, then consider setting the ith dimension and the jth dimension as a joint dimension;

define ScoreJoint (i, j)=Score (i)*Score (j), if ScoreJoint (i, j) is less than the designated threshold, the ith group of the joint dimension and the jth group of the joint dimensions are combined into a group of joint dimensions;

define Max as a maximum number of dimensions of a single query in the statistics result, and define W as a dimension expansion coefficient of a designated value, and then set Max*W as a maximum value of a dimension number range; and define Score(i)=Wp*CD(i)+Wb*F (i)/F, i.e. sorting all of the pre-calculated dimensions according to a value of Score (i) in descending order, wherein F is defined as number of times the ith dimension becomes a filter condition in the query, F is a total number of filter conditions in the query statistics, Wp is a physical modeling weight, Wb is a business modeling weight, and CD(i) is the cardinality of the ith dimension.

The balance between physical modeling and business modeling is very important. If the physical modeling weight is too high, it will lead to a strong generalization of the model. However, the query performance for the target SQL may not be optimal. If the business modeling weight is too high, it will lead to an over-fitting model. It can achieve the best query performance only for the target SQL. However, optimal performance cannot be guaranteed for queries outside the target SQL. Therefore, the method of the present application can effectively avoid the occurrence of these problems and improve the accuracy of the model.

Embodiment 3

FIG. 5 shows an automatic modeling system using the automated modeling method based on the OLAP pre-calculation model. The system may include a data statistics module; a business model module; a query statistics module; and a model establishing module, wherein the data statistics module collects the data statistics according to the data model and the data source given by the user, and obtains a result of the data statistics; the business model module conducts a query dryrun according to the data model and the sample queries given by the user to determine the business model; the query statistics module conducts a query dryrun on the sample queries, and collects the query statistics; the model establishing module obtains a result of business modeling based on the data statistics module, the business model module, and the query statistics module.

In the present specification, the illustrative expressions of the above-mentioned terms need not be directed to the same embodiments or examples. Moreover, the particular features, structures, materials, or features described may be combined in any suitable manner in any one or more embodiments or examples. In addition, it will be apparent to those skilled in the art that various embodiments or examples described in this specification, as well as features of different embodiments or examples, may be combined.

The foregoing is merely a preferred embodiment of the present application and is not intended to be limiting. Any modifications, equivalent substitutions, improvements, and the like within the spirit and principles of the application are to be included within the scope of the appended claims.

What is claimed is:

1. A method creating an online analytical processing (OLAP) pre-calculation model in a computer system as a big data analysis platform by automatic modeling, the OLAP pre-calculation model comprising: a dimension module; an aggregation group module; and a measure module, the dimension module comprising a normal dimension unit and a derived dimension unit, wherein the normal dimension unit pre-calculates a column of a fact table or dimension table, and the derived dimension unit pre-calculates the primary key of a dimension table and records a mapping relation between a column and the primary key of the dimension table; the primary key of the dimension table of the derived dimension in the derived dimension unit and a normal dimension in the normal dimension unit being used as a number of pre-calculated dimensions, conforming to a designated ordered sequence; wherein the aggregation group module divides the pre-calculated dimensions in the dimension module into a plurality of aggregation groups; and the measure module generates a result of pre-calculation according to a combined aggregation of all of the pre-calculated dimensions in the dimension module; the method comprising:

S1: collecting data statistics according to a data model and a data source given by a user to obtain a result of the data statistics;

S2: conducting a query dryrun according to the data model and sample queries given by the user to determine a business model;

S3: conducting a query dryrun on the sample queries, and collecting query statistics;

S4: carrying out a physical modeling based on the business model in S2 and the result of the data statistics in S1, and defining dimension, measure, and aggregation group of a pre-calculation model;

S5: adjusting the model after the physical modeling in S4 based on the query statistics in S3 to obtain a result of business modeling;

S6: optimizing the business modeling in S5 to obtain the OLAP pre-calculation model;

wherein the physical modeling in S4 comprises a dimension setting; a measure setting, and an aggregation group setting;

wherein the dimension setting comprises a normal dimension setting and a derived dimension setting; and the method comprises calculating an F(i) value for each dimension, and if F(i) is less than a designated threshold, then set an ith dimension as a derived dimension, otherwise set as a normal dimension; and defining F(i)=CD (col_i)/CD (PK), where CD (col_i) is a cardinality of the ith dimension, and CD (PK) is the primary key cardinality, the primary key of the derived dimension and the normal dimension are used as the pre-calculated dimensions, and are arranged in descending order according to the cardinality;

wherein the measure setting comprises generating pre-calculated measures directly based on measures of the business model; and wherein the aggregation group setting comprises adding all columns to an aggregation group by default and setting rules of the aggregation group according to dimension characteristics in the aggregation group;

the rules of the aggregation group setting comprise: setting a minimum value and a maximum value of a dimension number range as designated default values; when CD (i) is nearly equal to 1, then set the dimension as a mandatory dimension; when CD (i)/CD(i,j) and CD(j)/CD (i, j) are both nearly equal to 1, then set the ith dimension and the jth dimension as a set of joint dimensions; when CD (j)/CD(i,j) is nearly equal to 1 and CD(i)/CD(i j) is less than 1, then set the ith dimension and the jth dimension as a set of hierarchy dimensions, wherein function CD (i) is defined as cardinality of the ith dimension, and the hierarchy relationship are: ith dimension >jth dimension;

when the ith dimension and the jth dimension are simultaneously a join condition in a table of the data model, and do not participate in a join condition in other tables, then the ith dimension and the jth dimension are set as a group of joint dimensions; and when the CD (i) is less than a designated threshold, then the CD (i) is added to candidate groups of joint dimensions; the candidate groups are divided into a plurality of joint dimension groups, and a product of cardinality of each group is guaranteed to be within the set range.

2. The method according to claim 1, wherein the adjusting step in S5 comprises orderly adjusting the pre-calculated dimensions and adjusting the aggregation groups.

3. The method according to claim 2, wherein rules of orderly adjusting the pre-calculated dimensions comprise defining Score(i)=Wp*CD(i)+Wb*F(i)/F, i.e. sorting all of the pre-calculated dimensions according to a value of Score (i) in descending order; wherein F(i) is defined as number of times the ith dimension becomes a filter condition in the query, F is a total number of filter conditions in the query statistics, Wp is a physical modeling weight, Wb is a business modeling weight, and CD(i) is the cardinality of the ith dimension.

4. The method according to claim 2, wherein rules of adjusting the aggregation groups comprise: defining Score (i)=Wp*CD(i)+Wb*P (i)/P, if Score(i) is nearly equal to 1, then set the ith dimension as a mandatory dimension; defining Score (i, j)=Wp*CD(i)*CD(j)/CD(i, j)+Wb*P (i, j)/P, if score values of the ith dimension and the jth dimension are greater than a designated threshold, the ith dimension and the jth dimension are set as a joint dimension; wherein P(i) is defined as number of occurrences of the ith dimension in the query, P is number of sample queries, Wp is a physical modeling weight, Wb is a business modeling weight, and CD(i) is the cardinality of the ith dimension; defining ScoreJoint(i,j)=Score(i)*Score(j), if ScoreJoint(i,j) is less than the designated threshold, an ith group of the joint dimensions and a jth group of the joint dimensions are combined into a group of joint dimensions; wherein Max is defined as a maximum number of dimensions of a single query in the query statistics, and W is defined as a dimension expansion coefficient of a designated value, then set Max*W as a maximum value of a dimension number range.

5. The method according to claim 1, wherein the aggregation group module comprises a mandatory dimension unit; a joint dimension unit; a hierarchy dimension unit; and a dimension number range unit, wherein the mandatory dimension unit records all dimension combinations containing a designated dimension A, the joint dimension unit records all dimension combinations containing a designated joint dimension AB, the hierarchy dimension unit records all dimension combinations containing a designated joint dimension ABC having a hierarchical relationship, the dimension number range unit records all dimension combinations with number of dimensions within a certain range, and the aggregation group module divides all of the pre-calculated dimensions in the dimension module into a plurality of aggregation groups, while also preserves a combination of all pre-calculated dimensions in the dimension module for multi-dimensional querying between different aggregation groups.

* * * * *